United States Patent [19]

Moore

[11] 4,065,654
[45] Dec. 27, 1977

[54] MICROWAVE OVEN ADJUSTING (ENERGY DISTRIBUTION) AND TUNING ARRANGEMENT

[75] Inventor: Donald G. Moore, Glencoe, Ill.

[73] Assignee: Chemetron Corporation, Chicago, Ill.

[21] Appl. No.: 636,850

[22] Filed: Dec. 1, 1975

[51] Int. Cl.² .............................................. H05B 9/06
[52] U.S. Cl. ........................ 219/10.55 F; 219/10.55 E
[58] Field of Search ................... 219/10.55 F, 10.55 R, 219/10.55 E, 10.55 M

[56] References Cited

U.S. PATENT DOCUMENTS

| 3,271,169 | 9/1966 | Baker et al. | 219/10.55 E |
| 3,302,632 | 2/1967 | Fichtner | 219/10.55 E |
| 3,364,331 | 1/1968 | Johnson | 219/10.55 F |

Primary Examiner—Arthur T. Grimley
Attorney, Agent, or Firm—N. M. Esser

[57] ABSTRACT

An adjusting and tuning arrangement is provided in a microwave oven to adjust the energy distribution to various areas of the oven cavity such as defined areas or the area of a sensor assembly on a tray inserted in the oven and also to balance the distribution of energy between the load articles on the tray and the sensor assembly or between various load articles. Two electrically conductive planar elements are positioned inside and project into the cavity to accomplish the tuning. The planar elements are arranged one above the other at predetermined angular orientations and are also each independently rotatable about one edge.

14 Claims, 4 Drawing Figures

MICROWAVE OVEN ADJUSTING (ENERGY DISTRIBUTION) AND TUNING ARRANGEMENT

BACKGROUND OF THE INVENTION

A. Field of the Invention

The present invention relates most generally to the field of heating systems and microwave ovens and more particularly to an adjusting and tuning arrangement provided within a microwave oven to accomplish desired energy distributions within the oven.

B. Description of the Prior Art

In various applications of electromagnetic heating systems or microwave ovens, it is desirable to control the energy distribution within the heating cavity either in a nonuniform or uniform pattern to different areas of the cavity.

Such control is desirable in applications such as institutional feeding plans whereby a complete meal is elevated to serving temperatures in an efficient manner including items on a single tray which are to be served at different temperatures.

Systems and feeding plans of this variety are discussed and described in U.S. Pat. Nos. 3,854,021 which issued to Donald G. Moore, et al. on Dec. 10, 1974 and 3,854,022 which issued to Donald G. Moore on Dec. 10, 1974, which are hereby incorporated by reference for all purposes. The oven system referred to previously includes such energy control distribution arrangements as an energy shield designed or arranged to interfit with elements of the tray to shield certain items on the tray from being heated, such as ice cream or milk. A sensing element carried by the tray absorbs microwave energy along with certain food items on the tray and automatically controls the duration of the heating cycle in accordance with the requirements of the food items on the tray. The sensor location and energy shield both provide some measure of control of the energy distribution of the system.

However, further control of the energy distribution pattern is desirable to achieve various senergy distributions in various areas of the cavity or the tray to properly control distribution between the sensor assembly and load items depending upon load size, arrangement and characteristics of the oven. It would also be desirable to control the energy balance between various load items on the tray.

SUMMARY OF THE INVENTION

It is a principal object of the present invention, therefore, to provide an adjusting and tuning arrangement in a microwave oven that adjusts the energy distribution within the oven cavity.

It is another object to provide adjustment of the final temperatures of a given set of food loads in a given oven.

It is another object to adjust for variations in the energy distribution characteristics from one oven to another.

Another object is an adjusting and tuning arrangement that is variable to allow fine tuning to accomodate changes in load sizes.

Another object is an adjusting and tuning arrangement that is capable of simple assembly and adjustment to provide consistent, reliable distribution affects.

These and other objects of the present invention are effectively achieved through the provision of a first electrically conductive generally planer element that is positioned near a boundary of the cavity of the electromagnetic oven, such as a side wall. The first planar element is movable by a rotation about one horizontally oriented edge to provide energy distribution adjustment. A second substantially smaller planar element fabricated from electrically conductive material is positioned above and aligned with the first element and is also rotatable independently from the first planar element to provide additional control of the energy distribution pattern within the oven cavity.

The invention, both as to its organization and method of operation, together with further objects and advantages thereof, will best be understood by reference to the following specification taken in connection with the accompanying drawings.

BRIEF DESCRIPTION OF THE DRAWINGS

For a better understanding of the invention, frequent reference will be made to the drawings wherein.

DETAILED DESCRIPTION OF THE PREFERRED EMBODIMENT

Figure 1:
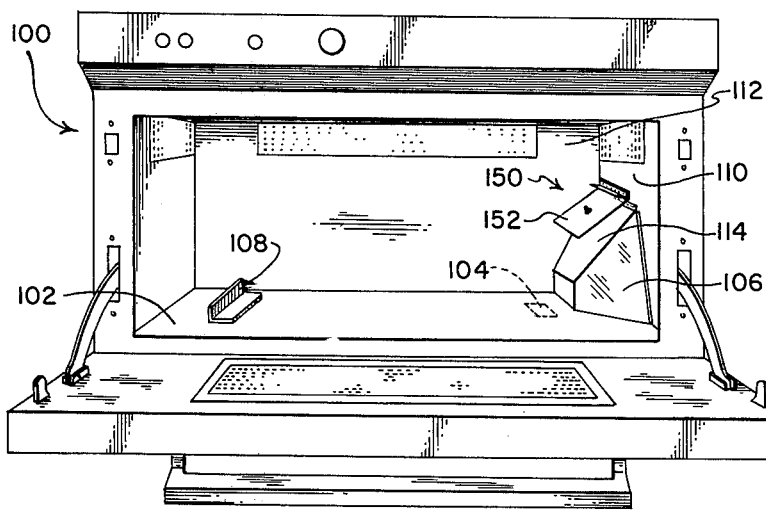
FIG. 1 is a front perspective view of a microwave oven illustrating the adjusting and tuning arrangement of the present invention.

Referring now to FIG. 1, the adjusting and tuning arrangement of the present invention referred to generally as 150 is illustrated positioned within an oven 100. The oven 100 is a Model 70/80 Menu Master (Registered Trademark) microwave oven sold by Litton Industries, Inc., Minneapolis, Minn., modified to be suitable for the practice of the invention, although equivalent electromagnetic heating systems can be used as well.

The floor 102 of the oven 100 is constructed from a nonmagnetic electrically conductive material such as type 304 stainless steel or the like. Beneath the conductive floor 102 of the oven 100 there is mounted a control assembly 104 shown in phantom comprising a permanent magnet and reed switch detector or alternatively, a movalb permanent magnet and associated switch, as described, for example, in more detail in the patents referred to previously.

The oven 100 is designed to accept food items which are carried by a serving tray (not shown) of generally rectangular shape that carries a ferrite sensor assembly with a ferrite sensor element.

Food items which are not to be heated are placed within a rectangular portion of the tray that is defined by conductive strips on the tray and food items which are to be heated are placed within other regions or portions of the tray. A boxlike electrically conductive shield (not shown) engages the conductive strips of the tray and protects the food items which are not to be heated from the electromagnetic energy that is developed within the oven 100. A guide element 108 and the inner edge of an energy focussing element 106 comprising a portion of the wall of the cavity cooperate to position the tray within the oven so that the sensor assembly carried by the tray may be coupled in operative association with the detector 104.

The adjusting and tuning arrangement 150 in FIG. 1, is positioned on the side wall 110 of the oven and above focussing element 106. The adjusting and tuning arrangement 150 which is shown in more detail in FIGS. 2, 3 and 4 includes a first generally planar, electrically conductive element 152 which is suspended from the side wall 110 by a bendable bracket or hinge assembly 154 attached to the planar element 152 by rivets 155 and to the wall 110 by the rivets 159. The first planar element 152 projects into the oven cavity above focussing means 106 at a predetermined acute angle β (beta) measured downwardly from a horizontal plane 157 through the hinge. The element 152 is rotatable about the hinge axis 154 such that the free end 156, the edge opposite the hinge, can be positioned to a desired height above the floor 102 of the cavity. The exact angle of deflection from the horizontal plane and accordingly the distance D of FIG. 2 from the edge of the element 152 to the oven floor 102 is adjusted to provide a desired final set of temperatures for a given set of food loads in a given oven, as will be explained in detail hereinafter. In one embodiment the element 152 is positioned by an adjustment device such as nylon screw 158 which is carried by the element 152 by means of nut 160. Upon rotation of the screw 158 which is positioned against the sloping wall 114 of the focussing member 106, the planar element 152 is rotated up or down to the desired point about the hinge 154. Planar adjusting element 152 is also spaced from the back rear wall 112 by a predetermined distance E (as shown in FIG. 4) to provide the proper energy distribution to the sensor 116 on a tray 117 (partially shown in FIG. 3), positioned on the floor 102 of the oven. The ferrite sensor member 116 of the sensor assembly carried by the tray should have a position relative to control element 152 as shown in phantom in FIG. 4.

A second generally planar electrically conductive element 175 is provided above the first element 152. Element 175 is of substantially smaller area than that of element 152. Element 175, positioned above element 152, extends in the same general direction into the oven cavity as element 152 but extends upwardly from the horizontal axis plane 157 at a predetermined angle α(alpha) and cooperates with element 152 in the adjustment and tuning of the oven so as to provide the desired energy distribution pattern. The second control element 175 is provided with a bendable flange portion 176 which is mounted to the side wall 110 by means of the rivets 159. A bead or beaded edge 178 is provided along the outer edge of element 175 which increases the radius or thickness of the planar element at its edge to reduce field intensity at that point. The two elements 152 and 175 are independently rotatable so that individual adjustments of the energy distribution may be made without mechanically affecting the adjustment or tuning achieved by the other element.

The focussing means 106 on side wall 110 is distended into the heating cavity or alternatively an insert may be placed within the oven cavity and secured in electrically conductive relation to the wall. This focussing means 106 covers about 50% of the surface area of the wall 110 anc comprises substantially planar sections. The function of the sloping wall portion 114 is to create a nonuniform energy distribution pattern within the oven. In cooperation with the energy shield (not shown) that interfits on the tray, the portion 114 concentrates energy in the area of the sensor 116. To further achieve the desired energy distribution within the oven and to direct the desired degree of energy concentration to the ferrite sensor element 116, the adjusting and tuning arrangement of the present invention by means of the adjustment of planar elements 152 and 175 are utilized to accomodate differences in load items and oven characteristics.

In addition to rotating the planar elements 152 and 175 to obtain the desired energy distribution, the height at which the element 152 is mounted on the wall 110 by means of hinge 154, also accomplishes variations in the energy distribution pattern. Also, the back corner 180 of element 175 which is in proximity to the rear wall 112, may be bent upwardly or downwardly to accomplish uniform heating of the ferrite sensor at 116 as an alternative to repositioning the element 152 with respect to the back wall 112 as defined by dimension E. The uniform heating of the ferrite sensor affects the off time or equalizing time of the microwave oven. The depth or distance F (as shown in FIG. 4) that element 175 extends into the cavity or oven in one embodiment is approximately a quarter wavelength at the operating frequency of the electromagnetic oven that is utilized.

Figure 3:
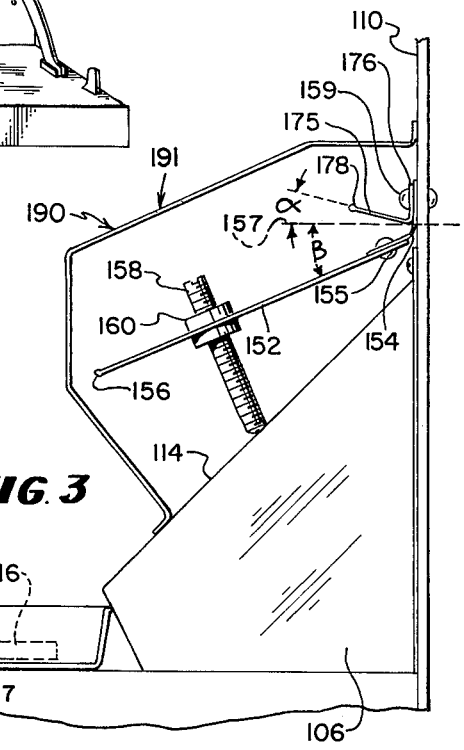
FIG. 3 is a side view of the adjusting and tuning arrangement shown in FIG. 2.
Figure 4:
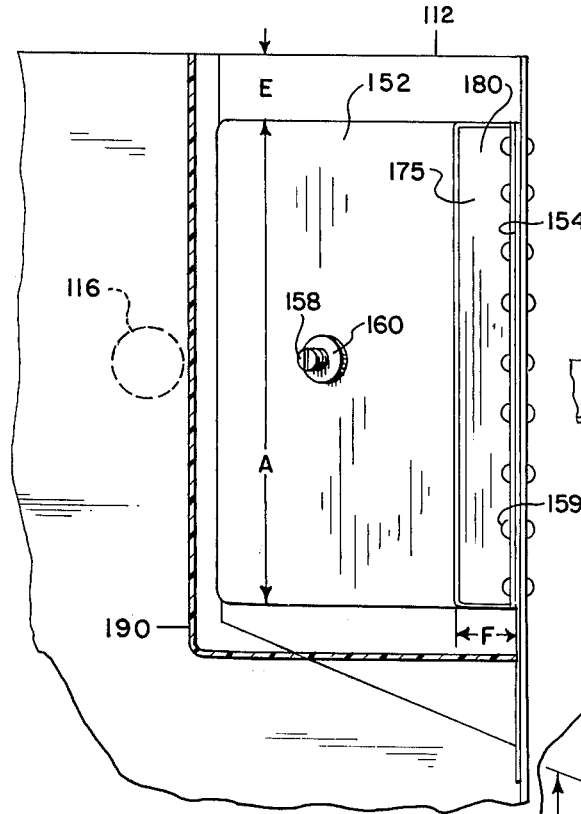
FIG. 4 is a top view of th adjusting and tuning arrangement shown in FIG. 2.
Figure 2:
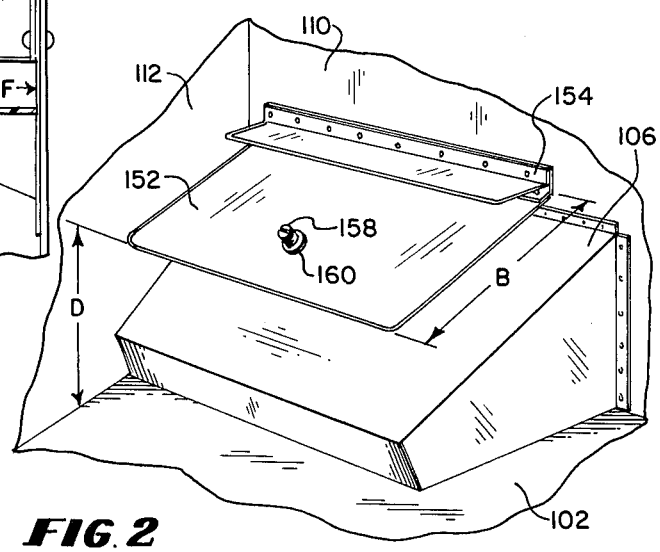
FIG. 2 is an enlarged perspective view of a portion of the microwave oven of FIG. 1 illustrating the details of the adjusting and tuning arrangement of the present invention.

By way of example and not by way of limitation the following dimensions are applicable to FIGS. 2, 3 and 4 and further describe the preferred embodiment of the invention. All dimensions given below are in centimeters. In those cases where the dimensions are not in precise accord with the figures as drawn, the dimensions are controlling. Variations from the precise dimensions given below may be necessary to compensate for various load conditions, oven characteristics, and control mechanisms and may be performed during final tuning, during manufacture or in the field as the application changes. It will be apparent to those skilled in the art that these dimensions may be modified without departing from the spirit of the invention.

Element 175
    angle α(alpha) 15° : (FIG. 3)
    A 14.7 cm: (FIG. 4)
    F 2.7 cm: (FIG. 4)

Element 152
    angle β(beta) 15°: (FIG. 3)
    B 11.8 cm: (FIG. 2)
    A 14.7 cm: (FIG. 4)
    E 2.0 cm: (FIG. 4)

A transparent cover 190 (FIG. 3) is also provided to keep any dirt or particles from accumulating on the control elements 152 and 175 and is also useful to protect the adjustment of elements 152 and 175 from accidental jarring or disturbance. The cover is fabricated from a material that has minimal effect on the energy delivered to the sensor assembly located at 116. The overall shape of the cover is defined so as to cover the control elements 152 and 175 and extends downwardly along the outer boundaries of the control elements and focussing means 106 to enclose these elements. A hole 191 in this cover is provided for adjustment of screw 158 with the cover in position.

From the foregoing it will be understood that the applicant has provided on adjusting and tuning arrangement in a microwave oven that adjusts the energy distribution or concentration within the oven cavity by means of two generally planar elements, one located above the other which are each independently rotatable about a horizontal mounting axis and capable of being positioned at different angles relative to the oven boundary walls to achieve a desired energy distribution between load items carried by the tray when inserted into the oven and to the sensor assembly carried by the tray to accomplish the proper heating of the articles.

While thre has been illustrated and described a single embodiment of the present invention, it will be apparent that various changes and modifications thereof will occur to those skilled in the art. It is intended in the appended claims to cover all such changes and modifications as fall within the true spirit and scope of the present invention.

Having described what is new and novel and desired to secure by Letters Patent, what is claimed is:

1. In a system for heating articles by supplying electromagnetic energy to the articles to be heated which are carried by a tray placed within a cavity defined in a heating structure of the system,
means for adjusting the distribution of energy supplied to particular areas of the cavity comprising a first generally planar electrically conductive member positioned in the cavity and near a boundary of the cavity and being movable such that a first edge is rotatable about a second opposite edge.

2. Distribution adjusting means as recited in claim 1 wherein said generally planar member is positioned a predetermined distance above the floor boundary of the cavity dependent upon the dimensions and characteristics of the particular cavity and load to be heated.

3. Distribution adjusting means as recited in claim 1 further comprising a nonconductive adjusting member positioned between said generally planar member and a boundary of the cavity, said adjusting member being capable of rotatably positioning said generally planar member about said second edge.

4. The distribution adjusting means as recited in claim 1 further comprising a second generally planar electrically conductive member positioned above said first generally planar member and being of substantially smaller area than said first generally planar member, said second member being rotatable about an axis parallel to said second edge of said first member, said first and second members being combinational in effect to adjust the distribution of energy in said cavity to said load items.

5. The distribution adjusting means as recited in claim 4 wherein said second member is provided with a beaded edge at the periphery of that portion which projects into the cavity.

6. The distribution adjusting means as recited in claim 4 wherein said second member projects into the cavity as measured along a direction perpendicular to a boundary wall of the cavity, a distance approximately equal to a quarter wavelength at the operating frequency of the electromagnetic energy source in the heating system.

7. A distribution adjusting means as recited in claim 4 wherein a corner of said second member may be adjusted in an upward or downward direction out of the normal plane of said second member to change the energy distribution in a predetermined area of the cavity.

8. Distribution adjusting means as recited in claim 4 wherein said second member is inclined at an angle of approximately 15° relative to the plane of the cavity floor.

9. Distribution adjusting means as recited in claim 1 further comprising a nonconductive cover that extends over said first and second planar members and is fabricated from a material that exhibits low energy loss characteristics.

10. Distribution adjusting means as recited in claim 1 wherein said heating system includes a generally rectangular tray on which articles are placed, said tray being positioned within the cavity along a lower boundary or floor of the cavity, said tray including a sensor assembly for absorbing quantities of electromagnetic energy, said distribution adjusting means positioned in a predetermined relationship to said sensor assembly and being effective to control the energy delivered to said sensor assembly in a predetermined relationship relative to the other articles on said tray.

11. Distribution adjusting means as recited in claim 10 further comprising a distended planar portion extending from the boundary wall where said first and second elements are positioned, said distended portion being located below said planar members.

12. Distribution adjusting means as recited in claim 11 wherein said heating system includes an energy shield designed to interfit with said tray and cooperating with said first and second planar elements and said distended portion to concentrate energy distribution to said sensor assembly.

13. Apparatus for adjusting the distribution of energy in an electromagnetic heating oven having a cavity in which items to be heating are placed comprising a first generally planar electrically conductive member positioned in said cavity and near a boundary wall of said cavity and being movable such that a first edge is rotatable about a second opposite edge.

14. Apparatus for tuning the distribution of energy in an electromagnetic heating oven having a cavity in which items to be heated are placed comprising a first generally planar electrically conductive member positioned in said cavity and near a boundary wall of said cavity, said first planar element oriented at a predetermined angle from the reference plane perpendicular to the boundary wall and at a predetermined height above the cavity floor.

* * * * *